United States Patent
Tamura et al.

(10) Patent No.: US 10,483,536 B2
(45) Date of Patent: Nov. 19, 2019

(54) PRODUCTION METHOD OF LITHIUM-CONTAINING COMPOSITE OXIDE AND LITHIUM-CONTAINING COMPOSITE OXIDE

(71) Applicant: SUMITOMO CHEMICAL CO., LTD., Tokyo (JP)

(72) Inventors: Masahiko Tamura, Chiyoda-ku (JP); Takeshi Kawasato, Chiyoda-ku (JP); Satoshi Asakura, Chuo-ku (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 513 days.

(21) Appl. No.: 14/824,681

(22) Filed: Aug. 12, 2015

(65) Prior Publication Data

US 2016/0056458 A1    Feb. 25, 2016

(30) Foreign Application Priority Data

Aug. 20, 2014  (JP) .................................. 2014-167662
Jul. 1, 2015    (JP) .................................. 2015-132879

(51) Int. Cl.
*H01M 4/485*     (2010.01)
*C01G 53/00*     (2006.01)
(Continued)

(52) U.S. Cl.
CPC .......... *H01M 4/485* (2013.01); *C01G 53/006* (2013.01); *C01G 53/50* (2013.01); *H01M 4/505* (2013.01);
(Continued)

(58) Field of Classification Search
CPC ...................................................... H01B 1/08
See application file for complete search history.

(56) References Cited

U.S. PATENT DOCUMENTS

2004/0234857 A1* 11/2004 Shiozaki ................ B82Y 30/00
                                                          429/231.3
2013/0230775 A1*  9/2013 Endo ..................... H01M 4/131
                                                             429/223

FOREIGN PATENT DOCUMENTS

JP          3233352      11/2001
JP          3591195      11/2004
(Continued)

OTHER PUBLICATIONS

Hyung-Joo Noh, et al., "Comparison of the structural and electrochemical properties of layered Li [Ni$_x$ Co$_y$ Mn$_z$] O$_2$ (x=1/3, 0.5, 0.6, 0.7, 0.8 and 0.85) cathode material for lithium-ion batteries", Journal of Power Sources, vol. 233, 2013, pp. 121-130.

*Primary Examiner* — William D Young
(74) *Attorney, Agent, or Firm* — Oblon, McClelland, Maier & Neustadt, L.L.P.

(57) ABSTRACT

There is provided a production method of a lithium-containing composite oxide capable of improving performances of cycle characteristics, rate characteristics, and the like of a lithium ion secondary battery. A production method of a lithium-containing composite oxide is characterized in that when producing a lithium-containing composite oxide by mixing a transition metal hydroxide containing Ni and Mn essentially and a lithium source and heating the mixture, a transition metal hydroxide having a crystallite diameter of the (100) plane being 35 nm or less in a crystal structure model in the space group P-3m1 of an X-ray diffraction pattern is used.

4 Claims, 2 Drawing Sheets

(51) Int. Cl.
*H01M 4/505* (2010.01)
*H01M 4/525* (2010.01)
H01M 10/0525 (2010.01)
H01M 4/02 (2006.01)

(52) U.S. Cl.
CPC ......... *H01M 4/525* *(2013.01); C01P 2002/74 (2013.01); C01P 2004/61 (2013.01); C01P 2006/12 (2013.01); C01P 2006/40 (2013.01); H01M 10/0525 (2013.01); H01M 2004/021 (2013.01); H01M 2004/028 (2013.01)*

(56) References Cited

FOREIGN PATENT DOCUMENTS

| | | |
|---|---|---|
| JP | 2011-116580 A | 6/2011 |
| JP | 2012-4097 A | 1/2012 |

* cited by examiner

PRODUCTION METHOD OF LITHIUM-CONTAINING COMPOSITE OXIDE AND LITHIUM-CONTAINING COMPOSITE OXIDE

CROSS REFERENCE TO RELATED APPLICATION

This application is based upon and claims the benefit of priority from Japanese Patent Applications Nos. 2014-167662, filed on Aug. 20, 2014 and 2015-132879, filed on Jul. 1, 2015; the entire contents of all of which are incorporated herein by reference.

FIELD

Embodiments described herein relate generally to a production method of a lithium-containing composite oxide and a lithium-containing composite oxide.

BACKGROUND

In a lithium ion secondary battery, a lithium-containing composite oxide (for example, $LiMnO_2$) is used as a cathode active material. The lithium-containing composite oxide is a composite oxide containing, in addition to Li, transition metal elements of Ni, Co, Mn, and the like and other metal elements being doped elements as a composition. The crystal structure of the lithium-containing composite oxide is a layered structure having a metal atom layer, a lithium atom layer, and an oxygen atom layer.

The lithium ion secondary battery is required to have a characteristic in which a discharge capacity does not decrease by repetition of a charge and discharge cycle, (which will be called cycle characteristics, hereinafter). Further, in the lithium ion secondary battery, an improvement in characteristic in which a discharge capacity does not decrease on the occasion of high-rate discharge, (which will be called rate characteristics, hereinafter), is also required.

It is known that the cycle characteristics and the rate characteristics are affected by exchange of a metal atom and a lithium atom in the crystal structure of the lithium-containing composite oxide, (this phenomenon will be called cation mixing, hereinafter). This is thought that by cation mixing, a path where lithium ions should diffuse originally is blocked, and thereby a discharge capacity decreases, and as a result, the cycle characteristics of the lithium ion secondary battery decrease. Here, it is known that there is a negative correlation between the frequency of occurrence of cation mixing and a peak intensity ratio ($I_{003}/I_{104}$) between, in an X-ray diffraction pattern of the lithium-containing composite oxide, an integral value ($I_{003}$) of a diffraction peak of the (003) plane and an integral value ($I_{104}$) of a diffraction peak of the (104) plane. That is, it indicates that when the peak intensity ratio becomes large, the occurrence of cation mixing decreases.

Further, as a factor affecting the cycle characteristics, the crystallite diameter of the (110) plane of the lithium-containing composite oxide is known. Then, it is known that when the crystallite diameter of the (110) plane exceeds 100 nm, the cycle characteristics decrease.

SUMMARY

In recent years, regarding the cathode active material, improvements in the rate characteristics and the cycle characteristics are required. As described above, the factors affecting the rate characteristics and the cycle characteristics in the crystal structure of the lithium-containing composite oxide are known, but the lithium-containing composite oxide satisfying all the factors of the crystal structure is not obtained yet. Therefore, there is room for further improvements in the rate characteristics and the cycle characteristics.

An object of the present invention is to provide a production method of a lithium-containing composite oxide capable of providing a lithium ion secondary battery excellent in cycle characteristics and rate characteristics.

The present inventors focused on the control of a peak intensity ratio ($I_{003}/I_{104}$) and a crystallite diameter of the (110) plane of a lithium-containing composite oxide and reached the completion of the present invention. That is, a production method of a lithium-containing composite oxide of the present invention, (which will be called this production method, hereinafter), is characterized in that when producing a lithium-containing composite oxide by mixing a transition metal hydroxide containing Ni and Mn essentially and a lithium source and heating the mixture, a transition metal hydroxide having a crystallite size of the (100) plane being 35 nm or less in a crystal structure model in the space group P-3m1 of an X-ray diffraction pattern is used.

According to this production method of the present invention, it is possible to obtain a lithium-containing composite oxide in which a crystallite size of the (110) plane is small and a ratio ($I_{003}/I_{104}$) between an integral value of a diffraction peak of the (003) plane and an integral value of a diffraction peak of the (104) plane is large in a crystal structure model of the space group R-3m (R3barm) in an X-ray diffraction pattern. As a result, when the lithium-containing composite oxide obtained by the production method of the present invention is used, it is possible to improve the cycle characteristics and the rate characteristics of a lithium ion secondary battery.

DETAILED DESCRIPTION

Figure 1:
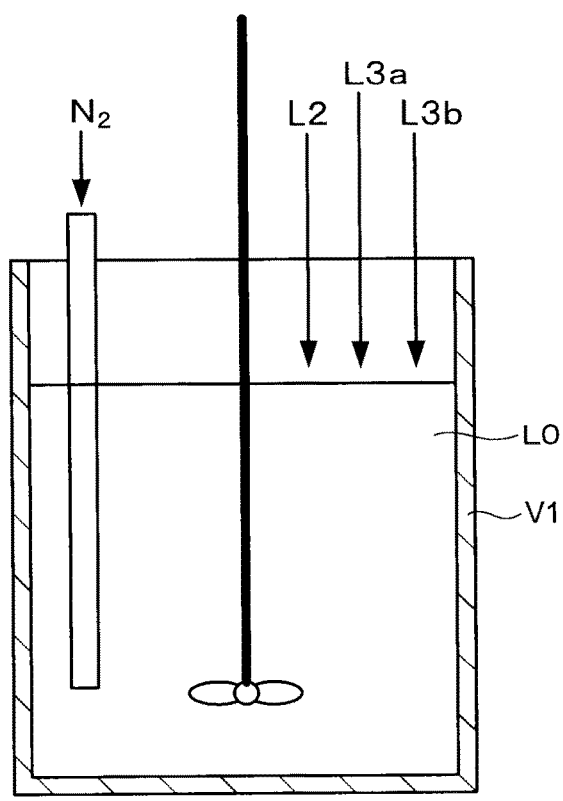
FIG. 1 is a view schematically illustrating a state of production of a hydroxide by a "batch method" in this production method.

In the present description, the notation of "Li" does not denote a metal simple substance thereof but an Li element unless otherwise mentioned. The same is also applied to the notations of other metals of Ni, Mn, Co, and so on.

[1] Production Method of a Lithium-Containing Composite Oxide

In this production method, when producing a lithium-containing composite oxide by mixing a transition metal hydroxide containing Ni and Mn essentially and a lithium source to heat the mixture, a transition metal hydroxide having a crystallite size of the (100) plane being 35 nm or less in a crystal structure model of the space group P-3m1 of an X-ray diffraction pattern is used.

In this production method, the hydroxide may be only a hydroxide, or may also be a mixture containing an oxyhydroxide obtained by part of hydroxide being oxidized and a hydroxide.

The lithium-containing composite oxide obtained by this production method is represented by Formula 5-A below.

$$Li_{\alpha 1}Ni_{x1}Mn_{y1}Co_{z1}Me_{a1}O_{b1} \quad \text{Formula 5-A}$$

where Me represents at least one type of element selected from the group consisting of Mg, Ca, Al, Ti, V, Cr, Nb, Mo, W, and Zr, and $\alpha 1$, $x1$, $y1$, $z1$, $a1$, and $b1$ satisfy the relations of $1.02 \leq \alpha 1 \leq 1.2$, $0.3 < x1 < 1$, $0 < y1 < 0.7$, $0 \leq z1 < 0.7$, $0 \leq a1 \leq 0.1$, and $x1+y1+z1+a1=1$, and $1.9 \leq b1 \leq 2.1$ respectively.

In Formula 5-A, $x1$, $y1$, $z1$, and $a1$ are preferably within the following ranges respectively. They are $0.3 < x1 \leq 0.6$, $0.2 \leq y1 \leq 0.4$, $0.15 \leq z1 \leq 0.35$, and $0 < a1 \leq 0.1$.

The crystallite size of the (100) plane of the hydroxide used in this production method is a value calculated from an X-ray diffraction pattern measured by using a slurry of the hydroxide being suspended in an aqueous medium. In this production method, the hydroxide having a crystallite size of the (100) plane being 35 nm or less is used, thereby making it possible to increase a peak intensity ratio ($I_{003}/I_{104}$) of the lithium-containing composite oxide. That is, this production method makes it possible to produce a lithium-containing composite oxide in which occurrence of cation mixing is suppressed. The crystallite size of the (100) plane of the hydroxide is preferably 33 nm or less, and more preferably 30 nm or less. Further, the crystallite size of the (100) plane of the hydroxide is preferably 13 nm or more, and more preferably 15 nm or more. The crystallite size of the (100) plane of the hydroxide being 13 nm or more makes it possible to make the crystallite size of the (110) plane of the lithium-containing composite oxide into an appropriate size and stabilize a crystal structure.

The composition of metal components contained in the hydroxide is preferably represented by Formula 1 below.

$$Ni_xMn_yCo_zMe_a \quad \text{Formula 1}$$

(where Me represents at least one type of element selected from the group consisting of Mg, Ca, Al, Ti, V, Vr, Nb, Mo, W, and Zr, and x, y, z, and a satisfy the relations of $0.3 < x < 1$, $0 < y < 0.7$, $0 \leq z < 0.7$, $0 \leq a \leq 0.1$, and $x+y+z+a=1$ respectively.)

In Formula 1, x represents the content ratio of Ni contained in the hydroxide. The lithium-containing composite oxide containing Ni makes it possible to increase a discharge capacity of a lithium ion secondary battery. Therefore, as long as the content ratio of Ni is $0.3 < x < 1$, it is possible to increase the discharge capacity of a lithium ion secondary battery having the lithium-containing composite oxide obtained by using this. The lower limit of x is preferably 0.33 to enable a higher discharge capacity of a lithium ion secondary battery. Further, the upper limit of x is preferably 0.8, and more preferably 0.6 in order to suppress occurrence of cation mixing in the lithium-containing composite oxide.

In Formula 1, y represents the content ratio of Mn contained in the hydroxide. In the lithium-containing composite oxide containing Mn, the crystal structure becomes stable. The lower limit of y is preferably 0.1, and more preferably 0.2. On the other hand, when the ratio of Mn increases among the metals of the lithium-containing composite oxide, there is a risk that the discharge capacity of a lithium ion secondary battery containing this decreases. Therefore, the upper limit of y is preferably 0.6, and more preferably 0.5.

In Formula 1, z represents the content ratio of Co contained in the hydroxide. The lithium-containing composite oxide containing Co makes it possible to improve cycle characteristics of a lithium ion secondary battery. Therefore, the range of z is preferably $0.1 \leq z \leq 0.6$, and more preferably $0.1 \leq z \leq 0.4$.

In Formula 1, a represents the content ratio of at least one type of element (Me) selected from the group consisting of Mg, Ca, Al, Ti, V, Cr, Nb, Mo, W, and Zr contained in the hydroxide. In the lithium-containing composite oxide containing Me, the crystal structure becomes stable.

The hydroxide is preferably particulate. A median diameter D50 of the hydroxide (cumulative 50% particle diameter in a volume-based particle size distribution) is preferably 3 to 15 μm. The median diameter D50 is a particle diameter at a point where a volume-based particle size distribution is obtained and a cumulative curve with the total volume being 100% becomes 50%, and can be measured by using, for example, a laser diffraction/scattering particle size distribution analyzer (Partica LA-950VII manufactured by HORIBA, Ltd.).

The hydroxide preferably has a specific surface area (SSA) of 1 to 20 $m^2/g$, more preferably 1 to 17 $m^2/g$, and further preferably 3 to 16 $m^2/g$. The specific surface area (SSA) is a value measured by using an adsorption BET (Brunauer, Emmett, Teller) method with the use of a nitrogen gas. The specific surface area (SSA) can be measured by using, for example, a specific surface area (SSA) analyzer (apparatus name: HM model-1208 manufacture by Mountech CO., Ltd.).

(Production of the Hydroxide)

A means to obtain the hydroxide is not limited in particular, but a coprecipitation method is preferable because a hydroxide uniformly containing metal components is obtained. As a method of obtaining a hydroxide by the coprecipitation method, batch methods are preferable. Among the batch methods, a method to grow seed crystals in a reaction tank and produce a hydroxide, (which will be called a seeding method, hereinafter), is more preferable. The seeding method is preferable because it brings the shape of hydroxide close to a spherical shape. The lithium ion secondary battery having a lithium-containing composite oxide obtained by using a sub-spherical hydroxide is preferable because it is excellent in cycle characteristics.

In the seeding method, to an aqueous medium containing seed crystals, an aqueous transition metal compound solution containing Ni and Mn essentially and alkali are added continuously and the seed crystals are made to grow by a coprecipitation method, to thereby obtain a transition metal hydroxide. As the seed crystals, particles obtained by continuously adding alkali to an aqueous transition metal solution containing Ni and Mn essentially by a coprecipitation method are preferable.

A method of obtaining a hydroxide by a batch method will be concretely explained by using FIG. 1.

An aqueous medium L0 is added to a reaction tank V1. By supplying a nitrogen ($N_2$) gas into the reaction tank, a bubbling state (bubbly state) is made and stirring is performed. At this time, the reaction tank is sometimes heated by a heater or the like in order to maintain the temperature of a reaction solution to a predetermined temperature. Next, to the reaction tank V1, an aqueous transition metal compound solution containing Ni and Mn essentially L2 and alkali L3a are continuously added. Thereby, a transition metal hydroxide is obtained by a coprecipitation method. Another solution L3b other than these solutions may also be added to the reaction tank V1.

While continuously supplying the above-described solution into the reaction tank V1, the solution is discharged through an overflow port (not illustrated) of the reaction tank, to thereby keep the volume in the reaction tank constant. It is preferable to apply a filter cloth or the like to the overflow port and make only a supernatant liquid overflow therethrough. This makes it possible to increase a solid content concentration in the reaction tank V1 and decrease generation of new particles, resulting in that it is possible to narrow the particle size distribution.

After the supply of the aqueous transition metal compound solution containing Ni and Mn essentially is finished, reaction in the reaction tank V1 is finished. At this time, the reaction solution and a slurry of hydroxide remain in the reaction tank V1. The hydroxide is separated from the slurry and the hydroxide to be used for this production method is obtained.

The aqueous medium may be water or mixed solution that contains an additive in water without inhibiting the reaction. The content ratio of the additive is preferably 0 to 20% relative to the total mass. As the additive, water-soluble alcohol such as ethanol is cited.

The aqueous transition metal compound solution containing Ni and Mn essentially is an aqueous solution of the transition metal compound being dissolved in the aqueous medium. As the transition metal compound, a sulfate containing transition metal, a nitrate, and the like are cited. In terms of handleability, the sulfate containing transition metal is preferable. In this production method, a nickel sulfate, a cobalt sulfate, a manganese sulfate, and a hydrate of them are more preferable in order to enable a desired metal composition.

The alkali is used for adjusting the reaction solution to alkaline conditions. In the coprecipitation method, the alkali is likely to be maintained under a condition that hydroxides are likely to precipitate, so that as the alkali, a sodium hydroxide or a potassium hydroxide is preferable. In terms of the fact that alkali is likely to maintain the pH of a predetermined reaction solution to a predetermined value, an aqueous solution containing alkali is preferable. That is, an aqueous sodium hydroxide solution and an aqueous potassium hydroxide solution are preferable, and in terms of handleability, the aqueous sodium hydroxide solution is more preferable.

As the above-described other solutions, for example, a solution to adjust solubility of the above-described transition metal compound is cited. To be more precise, an aqueous solution containing ammonium ions is cited. As an ammonium ion source, an ammonium sulfate, an ammonium salt such as ammonium chloride and ammonia are cited.

The seeding method is the same method as the batch method as explained above except that together with the aqueous medium L0, seed crystals are added to the reaction tank V1. The seed crystal only needs to be the one to be a source of growth by the coprecipitation method. From a view point of making a metal composition contained in the obtained hydroxide fall within a predetermined range and making the crystallite size of the (100) plane of the hydroxide be 35 nm or less easily, the transition metal hydroxide is preferable. As described above, the hydroxide obtained by the coprecipitation method is preferable.

(Two-Stage Seeding)

The hydroxide to be used for this production method is preferably obtained by using the hydroxides obtained by the coprecipitation method as seed crystals and making the seed crystals grow by the coprecipitation method. The seed crystals can precipitate by the coprecipitation method with the use of the same solution as that used in a method of growing hydroxides.

Figure 2:
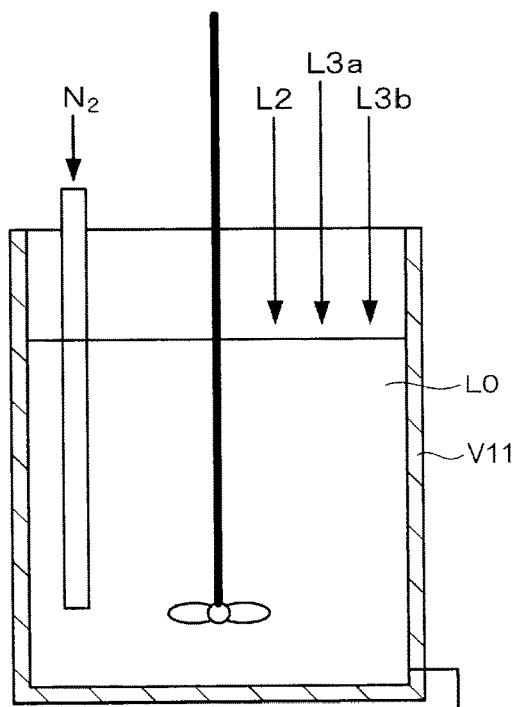
FIG. 2 is a view schematically illustrating a state of production of a hydroxide by a "seeding method" in this production method.
Figure 2:
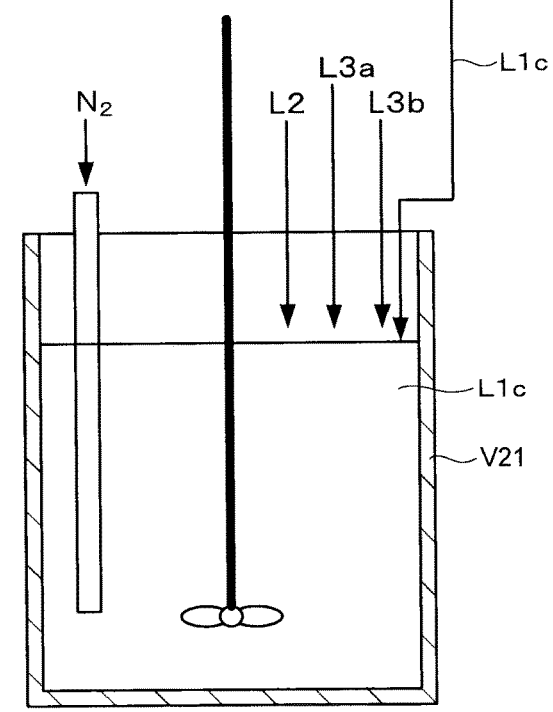

There will be concretely explained a method in which seed crystals are made to precipitate by the coprecipitation method and hydroxides are obtained by the seeding method with the use of the obtained seed crystals by using FIG. 2.

An aqueous transition metal compound solution containing Ni and Mn essentially L2 and alkali L3a are continuously added to a reaction tank V11. At this time, an initial solution L0 may also be supplied to the reaction tank V11 as necessary before the supply of the aqueous solution L2 and the alkali L3a. When the initial solution L0 is supplied, bubbling may also be caused by a nitrogen gas and the temperature may also be maintained to a predetermined temperature by a heater or the like, Further, in the supply of the above-described solutions, stirring may also be performed in the reaction tank V11 in order to cause uniform reaction. Further, in addition to the above-described solutions, another solution L3b may also be added to the reaction tank V11. Thereby, seed crystals are obtained by the coprecipitation method. The obtained seed crystals are made to overflow through an overflow port (not illustrated) of the reaction tank V11 and a solution L1c containing the seed crystals is transferred to a reaction tank V21.

The solution L1c containing the seed crystals is supplied into the reaction tank V21, and at the point when the volume in the reaction tank V21 becomes a predetermined amount, the aqueous transition metal compound solution containing Ni and Mn essentially L2 is supplied, and the alkali L3a is supplied so that the pH can be maintained to a predetermined pH. Thereby, the seed crystals are made to grow by the coprecipitation method.

While continuously supplying the above-described solutions into the reaction tank V21, the solution is discharged through an overflow port (not illustrated) of the reaction tank, to thereby keep the volume in the reaction tank constant. It is preferable to apply a filter cloth or the like to the overflow port and make only a supernatant liquid overflow therethrough.

After the supply of the aqueous transition metal compound solution containing Ni and Mn essentially is finished, reaction in the reaction tank V1 is finished. At this time, a reaction solution and a slurry of hydroxide remain in the reaction tank V1. The hydroxide is separated from the slurry and the hydroxide to be used for this production method is obtained.

(Separation of the Hydroxide)

The hydroxide is preferably separated by drying and washing the slurry containing the hydroxide. The drying temperature is preferably 50 to 300° C. As long as the drying is performed in this temperature range, a water content is eliminated sufficiently.

In the production method of this embodiment, the transition metal hydroxide containing Ni and Mn essentially and the lithium source are mixed and heated, and thereby the lithium-containing composite oxide is produced. On the occasion of mixing, a zirconium compound or a tungsten compound is preferably mixed in addition to the hydroxide and the lithium source. As long as these compounds are added on the occasion of mixing and are heated, the growth of the crystallite size of the (110) plane of the lithium-containing composite oxide can be suppressed.

As the lithium source, at least one type selected from a lithium carbonate, a lithium hydroxide, and a lithium nitrate is preferably used. Among them, as the lithium source, the lithium carbonate is particularly preferable in terms of handleability.

As the zirconium compound, a zirconium hydride, a zirconium hydroxide, a zirconium oxide, a zirconyl nitrate, a zirconyl carbonate, a zirconyl phosphate, a zirconyl sulfate, a zirconyl ammonium carbonate, and the like are cited.

Among them, the zirconium oxide is preferable because fine particles thereof can be easily obtained industrially and it is inexpensive.

As the tungsten compound, a tungsten oxide, an ammonium tungstate, and a sodium tungstate can be used. Among them, the tungsten oxide is preferable because fine particles thereof can be easily obtained industrially and it is inexpensive.

The zirconium compound and the tungsten compound each have a median diameter D50 of 0.1 to 20 µm. As long as the median diameter D50 is in this range, the zirconium compound and the tungsten compound can be uniformly mixed with the hydroxide and the lithium source, and further the growth of the crystallite size of the (110) plane of the obtained lithium-containing composite oxide can be suppressed. The median diameter D50 of the zirconium compound and the tungsten compound is more preferably 0.5 to 15 µm.

In the production method of this embodiment, for the mixing, a mixing device such as, for example, a rocking mixer, a Nauta mixer, a spiral mixer, a cutter mill, or a V mixer can be used.

In the mixing, a quantitative ratio between a total molar quantity $M_T$ of metal elements contained in the transition metal hydroxide and a molar quantity $M_L$ of Li contained in the lithium source is preferably a quantitative ratio of Expression 2 below. As long as they are mixed at the quantitative ratio of Expression 2 below, the lithium-containing composite oxide capable of increasing the discharge capacity of a lithium ion secondary battery is obtained. In terms of decreasing the occurrence of cation mixing, the quantitative ratio of Expression 2 below is 1.06 or more.

$$M_L/M_T > 1.02 \qquad \text{Expression 2}$$

The quantitative ratio of Expression 2 is preferably 1.2 or less, and more preferably 1.1 or less. As long as the quantitative ratio of Expression 2 is 1.2 or less, Li not entering a crystal layer (also referred to as free Li) can be decreased, resulting in that it is possible to enhance the cycle characteristics of a lithium ion secondary battery.

When the zirconium compound and the tungsten compound are mixed, a quantitative ratio between the sum molar quantity of the total molar quantity $M_T$ of metal elements contained in the transition metal hydroxide and a molar quantity $M_Z$ of Zr contained in the zirconium compound or a molar quantity $M_Z$ of W contained in the tungsten compound ($M_T$, $M_Z$) and the above-described molar quantity $M_L$ of Li contained in the lithium source is preferably a quantitative ratio of Expression 3 below. As long as the lithium-containing composite oxide obtained by mixing them at the quantitative ratio of Expression 3 is used, the discharge capacity of a lithium ion secondary battery can be increased.

$$M_L/(M_T+M_Z) > 1.02 \qquad \text{Expression 3}$$

The quantitative ratio of Expression 3 is more preferably 1.06 or more. This makes it possible to prevent Ni from entering a lithium layer of the lithium-containing composite oxide and suppress the occurrence of cation mixing. The quantitative ratio of Expression 3 is preferably 1.2 or less, and more preferably 1.1 or less. As long as the quantitative ratio of Expression 3 is 1.2 or less, the occurrence of free Li can be decreased and it is possible to enhance the cycle characteristics of a lithium ion secondary battery.

The quantitative ratio of the hydroxide, the zirconium compound, and the tungsten compound preferably satisfies the relation of Expression 4 below. When they are mixed at the quantitative ratio satisfying this relation, the content of Zr or W contained in the lithium-containing composite oxide can be made appropriate, and it is possible to suppress the growth of the crystallite size of the (110) plane of the lithium-containing composite oxide. As a result, the lithium-containing composite oxide whose cycle characteristics are improved without decreasing the discharge capacity is obtained. Incidentally, in Expression 4, $M_Z$ and $M_T$ are the same as those in Expression 3.

$$0 < M_Z/(M_T+M_Z) \leq 0.1 \qquad \text{Expression 4}$$

In the production method of this embodiment, for the calcination, a heating apparatus such as an electric furnace, a continuous firing furnace, or a rotary kiln can be used. As a calcination atmosphere, the air atmosphere is preferable, and the calcination is more preferably performed while supplying the air. Supplying the air during the calcination makes it possible to obtain the lithium-containing composite oxide having high crystallinity.

In the production method of this embodiment, a calcination temperature is preferably 930° C. or lower. Heating at a temperature of 930° C. or lower makes it possible to suppress the growth of the crystallite size of the (110) plane of the lithium-containing composite oxide. The calcination temperature is preferably 850° C. or higher, and more preferably 870° C. or higher. As long as the calcination is performed at 850° C. or higher, the lithium-containing composite oxide having high crystallinity can be obtained and the occurrence of cation mixing can be decreased.

A calcination time is preferably 5 to 12 hours.

(Lithium-Containing Composite Oxide)

A lithium-containing composite oxide of this embodiment is represented by Formula 5-B below, and in a crystal structure model of the space group R-3m (R3barm), a peak intensity ratio ($I_{003}/I_{104}$) between, in an X-ray diffraction pattern, an integral value ($I_{003}$) of a diffraction peak of the (003) plane and an integral value ($I_{104}$) of a diffraction peak of the (104) plane is not less than 1.18 nor more than 1.35, and a crystallite diameter of the (110) plane is 73 nm or less.

$$Li_{\alpha 2}Ni_{x2}Mn_{y2}Co_{z2}Me_{a2}O_{b2} \qquad \text{Formula 5-B}$$

where Me represents at least one type of element selected from the group consisting of Mg, Ca, Al, Ti, V, Cr, Nb, Mo, W, and Zr, and α2, x2, y2, z2, a2, and b2 satisfy the relations of $1.02 \leq \alpha 2 \leq 1.2$, $0.3 < x2 \leq 0.6$, $0.2 \leq y2 \leq 0.4$, $0.15 \leq z2 \leq 0.35$, $0 \leq a2 \leq 0.1$, $x2+y2+z2+a2+=1$, and $1.9 \leq b2 \leq 2.1$ respectively.

In Formula 5-B, α2 represents the content ratio of Li contained in the lithium-containing composite oxide. As long as α2 satisfies $1.02 \leq \alpha 2 \leq 1.2$, the discharge capacity of a lithium ion secondary battery can be increased, so that it is preferable. α2 is more preferably $1.06 \leq \alpha 2 \leq 1.12$, and further preferably $1.06 \leq \alpha 2 \leq 1.1$ because the occurrence of cation mixing can be decreased in the crystal structure and further the occurrence of free Li can be decreased.

In Formula 5-B, x2 represents the content ratio of Ni contained in the lithium-containing composite oxide. The lithium-containing composite oxide containing Ni makes it possible to increase the discharge capacity of a lithium ion secondary battery. Therefore, as long as the content ratio of Ni is $0.3 < x2 \leq 0.6$, the discharge capacity of a lithium ion secondary battery can be increased. x2 is preferably 0.33 or more in order to further increase the discharge capacity of a lithium ion secondary battery. Further, x2 is preferably 0.8 or less, and more preferably 0.6 or less in order to suppress the occurrence of cation mixing in the lithium-containing composite oxide.

In Formula 5-B, y2 represents the content ratio of Mn contained in the lithium-containing composite oxide. In the lithium-containing composite oxide containing Mn, the crystal structure becomes stable. y2 is preferably 0.25 or more, and more preferably 0.3 or more. On the other hand, when the ratio of Mn increases among the metals of the lithium-containing composite oxide, there is a risk that the discharge capacity of a lithium ion secondary battery containing this decreases. Therefore, y2 is preferably 0.35 or less, and more preferably 0.3 or less.

In Formula 5-B, z2 represents the content ratio of Co contained in the lithium-containing composite oxide. The lithium-containing composite oxide containing Co makes it possible to improve the cycle characteristics of a lithium ion secondary battery. Therefore, the range of z2 is preferably $0.2 \leq z2 \leq 0.35$, and more preferably $0.2 \leq z2 \leq 0.3$.

In Formula 5-B, a2 represents the content ratio of at least one type of element (Me) selected from the group consisting of Mg, Ca, Al, Ti, V, Cr, Nb, Mo, W, and Zr. The lithium-containing composite oxide containing Me is preferable because the crystal structure becomes stable.

In Formula 5-B, b2 represents the content ratio of oxygen contained in the lithium-containing composite oxide. As long as the range of b2 is $1.9 \leq b \leq 2.1$, the crystal structure of the lithium-containing composite oxide can be made stable.

In the lithium-containing composite oxide of this embodiment, the peak intensity ratio ($I_{003}/I_{104}$) between, in the X-ray diffraction pattern, the integral value ($I_{003}$) of the diffraction peak of the (003) plane and the integral value ($I_{104}$) of the diffraction peak of the (104) plane is not less than 1.18 nor more than 1.35, in the crystal structure model of the space group R-3m (R3barm). When the lithium-containing composite oxide whose peak intensity ratio ($I_{003}/I_{104}$) is in the above-described range is used as a cathode active material, the rate characteristics of a lithium ion secondary battery improve. The peak intensity ratio ($I_{003}/I_{104}$) is preferably 1.20 to 1.35, and more preferably 1.25 to 1.35.

In the lithium-containing composite oxide of this embodiment, a diffraction angle 2θ of the (003) plane and a diffraction angle 2θ of the (104) plane in the X-ray diffraction pattern correspond to a peak of 17 to 20° and a peak of 43 to 46° respectively.

In the lithium-containing composite oxide of this embodiment, the crystallite size of the (110) plane in the X-ray diffraction pattern is 73 nm or less. When the lithium-containing composite oxide having the crystallite size of the (110) plane being in the above-described range is used as a cathode active material, the cycle characteristics of a lithium ion secondary battery improve. The crystallite size of the (110) plane is preferably 65 nm or less.

In the lithium-containing composite oxide of this embodiment, a diffraction angle 2θ of the (110) plane in the X-ray diffraction pattern corresponds to a peak of 64.5 to 66°.

The lithium-containing composite oxide of this embodiment is preferably particulate. The median diameter D50 of the lithium-containing composite oxide is preferably 3 to 30 μm, more preferably 4 to 25 μm, and further preferably 5 to 20 μm.

The specific surface area (SSA) of the lithium-containing composite oxide of this embodiment is preferably 0.1 to 10 m$^2$/g, and particularly preferably 0.15 to 5 m$^2$/g. As long as the specific surface area of the lithium-containing composite oxide is 0.1 to 10 m$^2$/g, the discharge capacity is high and a positive electrode can be formed precisely.

[2] Lithium Ion Secondary Battery

A lithium ion secondary battery is a nonaqueous electrolyte secondary battery, and includes a positive electrode, a negative electrode, a separator, and a nonaqueous electrolyte.

[2-1] Positive Electrode

In the lithium ion secondary battery, the positive electrode is constituted by forming a cathode active material layer on a positive electrode current collector.

The cathode active material layer includes the lithium-containing composite oxide obtained by this production method or the lithium-containing composite oxide of this embodiment as a cathode active material. The cathode active material layer includes a conductive material and a binder in addition to this cathode active material. Additionally, other components of a thickener and the like may also be included as necessary.

In the cathode active material layer, as the conductive material, for example, conductive materials of carbon black (acetylene black, graphite, ketjen black, and the like) can be used. As the conductive material, one type may be used alone, or two types or more may also be used in combination.

In the cathode active material layer, as the binder, for example, polymeric materials of a fluorine-based resin (polyvinylidene fluoride, polytetrafluoroethylene, or the like), a polyolefin (polyethylene, polypropylene, or the like), a polymer having an unsaturated bond (styrene-butadiene rubber, isoprene rubber, butadiene rubber, or the like), and an acrylic acid-based polymer (acrylic acid copolymer, methacrylic acid copolymer, or the like) can be used. As the binder, one type may be used alone, or two types or more may also be used in combination.

In the cathode active material layer, as the thickener, for example, materials of carboxymethyl cellulose, methylcellulose, hydroxymethyl cellulose, ethylcellulose, polyvinyl alcohol, oxidized starch, phosphorylated starch, casein, polyvinylpyrrolidone, and the like can be used. As the thickener, one type may be used alone, or two types or more may also be used in combination.

As the positive electrode current collector, for example, a metal foil such as an aluminum foil or a stainless steel foil can be used.

[2-2] Negative Electrode

In the lithium ion secondary battery, the negative electrode is constituted by forming an anode active material layer on a negative electrode current collector.

The anode active material layer is formed by using an anode active material. As the anode active material, for example, materials of a lithium alloy, a lithium compound, a carbon material, a silicon carbide compound, a silicon oxide compound, a titanium sulfide, a boron carbide compound, and the like can be used. Additionally, oxides of Group 14 and Group 15 of the periodic table, ruthenium, molybdenum, tungsten, titanium, and the like may also be used.

Among the above, the carbon material is, for example, non-graphitizable carbon, artificial graphite, natural graphite, pyrolytic carbons, cokes, graphites, glassy carbons, an organic high-molecular compound heated body, carbon fibers, activated carbon, carbon blacks, and the like. The cokes are, for example, pitch coke, needle coke, petroleum coke, and the like. As the organic high-molecular compound heated body, it is possible to use one carbonated by heating a resin such as phenol resin or furan resin, for example.

The negative electrode current collector is a metal foil such as a nickel foil or a copper foil, for example.

The negative electrode is formed in a manner that a slurry containing the anode active material is applied to the negative electrode current collector to be dried and is pressed, and thereby the anode active material layer is provided on the negative electrode current collector, for example.

[2-3] Separator

In the lithium ion secondary battery, the separator is, for example, a microporous polyolefin film (polyethylene, polypropylene, or the like), or a film made of polyvinylidene fluoride and a hexafluoropropylene copolymer.

[2-4] Nonaqueous Electrolyte

In the lithium ion secondary battery, the nonaqueous electrolyte is a solid-state or gelled polyelectrolyte obtained by mixing or dissolving an inorganic solid electrolyte and an electrolyte salt, or the like, besides a nonaqueous electrolytic solution.

Among them, the nonaqueous electrolytic solution is prepared by appropriately combining an organic solvent and an electrolyte salt. As the organic solvent, for example, a propylene carbonate, an ethylene carbonate, a diethyl carbonate, a dimethyl carbonate, 1,2-dimethoxyethane, 1,2-diethoxyethane, γ-butyrolactone, diethyl ether, sulfolane, methylsulfolane, acetonitrile, an acetic ester, butylate, and a propionate ester can be used. From a viewpoint of voltage stability, cyclic carbonates such as a propylene carbonate, and chain carbonates such as a dimethyl carbonate and a diethyl carbonate are preferable. As the organic solvent, one type may be used alone, or two types or more may also be used in combination.

As the inorganic solid electrolyte, for example, inorganic compounds such as a lithium nitride and a lithium iodide can be used.

As the solid-state polyelectrolyte, an electrolyte salt and an electrolyte containing a high molecular compound to dissolve the electrolyte salt can be used. As the high molecular compound to dissolve the electrolyte salt, ether-based (a polyethylene oxide, its crosslinked body, and the like), polymethacrylic acid ester-based, and acrylate-based high molecular compounds, and the like can be used.

A matrix of the gelled polyelectrolyte only needs to be one to be gelled by absorbing the nonaqueous electrolytic solution, and various high molecular compounds can be used. As the high molecular compound here, for example, fluorine-based high molecular compounds (a polyvinylidene fluoride, a vinylidene fluoride-hexafluoropropylene copolymer, and the like), polyacrylonitrile, an acrylonitrile copolymer, and ether-based high molecular compounds (a polyethylene oxide, an ethylene oxide copolymer, a crosslinked body of the copolymer, and the like) can be used. In the copolymerization with the ethylene oxide, for example, a monomer such as methyl methacrylate, butyl methacrylate, methyl acrylate, or butyl acrylate can be used. As a matrix of the gelled polyelectrolyte, the fluorine-based high molecular compounds in particular among the above-described high molecular compounds are preferably used in order to ensure stability for oxidation-reduction reaction.

As the electrolyte salt, well-known ones can be used, and for example, materials of $LiClO_4$, $LiPF_6$, $LiBF_4$, $CF_3SO_3Li$, and the like can be used.

[2-5] Characteristics of the Lithium Ion Secondary Battery of this Embodiment

As described above, in this embodiment, in the positive electrode of the lithium ion secondary battery, the cathode active material layer is formed by using the lithium-containing composite oxide obtained by this production method as the cathode active material.

In the lithium-containing composite oxide obtained by this production method, the occurrence of cation mixing is decreased. As a result, in the lithium ion secondary battery having the lithium-containing composite oxide, performances of the cycle characteristics, the rate characteristics, and the like improve. The lithium-containing composite oxide can be provided. Further, this production technique, namely this production method, being a method in which the discharge capacity does not easily decrease when a charge and discharge cycle is repeated, makes it possible to provide the lithium-containing composite oxide that does not easily cause a decrease in the discharge capacity at the time of high-rate discharge.

WORKING EXAMPLES

The present invention will be concretely explained below while citing working examples, but the present invention is not limited to the following working examples. As for the following examples, Examples 1 to 14 are working examples, and Examples 15 to 19 are reference examples. Various evaluations and measurements in each example were performed by the following methods.

[Measurement of the Specific Surface Area (SSA)]

The specific surface areas (SSA) of the hydroxide and the lithium-containing composite oxide were measured by a nitrogen adsorption BET method using a specific surface area analyzer (apparatus name: HM model-1208 manufacture by Mountech CO., Ltd.).

In the measurement of the specific surface area of the hydroxide, degassing was performed under the condition of 105° C. and 30 minutes.

In the measurement of the specific surface area of the lithium-containing composite oxide, degassing was performed under the condition of 200° C. and 20 minutes.

[Measurement of the Median Diameter D50]

The median diameters D50 of the hydroxide and the lithium-containing composite oxide were each set to a particle diameter at a point where a volume-based particle size distribution is obtained and a cumulative curve with the total volume being 100% becomes 50%. The particle size distribution was measured by using a laser diffraction/scattering particle size distribution analyzer (Partica LA-950VII manufactured by HORIBA, Ltd.). In the measurement of the particle size distribution, water was used as a dispersion medium.

[Analysis of the Metal Composition]

The compositions of the metal components of the hydroxide and the lithium-containing composite oxide were analyzed by an analysis method using inductively coupled plasma (ICP).

From the analysis result of the hydroxide, x, y, z, a represented by a composition formula of Formula 1 (=$Ni_xMn_yCo_zMe_a$) were calculated.

From the analysis result of the lithium-containing composite oxide, $\alpha1$ or $\alpha2$, x1 or x2, y1 or y2, z1 or z2, and a1 or a2 represented by composition formulas of Formula 5-A and Formula 5-B were calculated. Each blank in Tables means unmeasured.

[Crystallite Diameter Measurement by an XRD]

The X-ray diffraction measurements of the hydroxide and the lithium-containing composite oxide were performed by using an X-ray diffractometer (apparatus name: SmartLab manufactured by Rigaku Corporation). A peak search of each obtained X-ray diffraction pattern was performed by using X-ray analysis software (integrated powder X-ray analysis software PDXL2 manufactured by Rigaku Corporation).

From the obtained X-ray diffraction pattern, the crystallite diameter was calculated by using the X-ray analysis software (integrated powder X-ray analysis software PDXL2 manufactured by Rigaku Corporation).

The X-ray diffraction measurement of the hydroxide was performed by using a slurry containing the hydroxide.

The X-ray diffraction measurement of the lithium-containing composite oxide was performed by using a powdered sample.

In Table 1, "Crystallite size of (100) plane" indicates the crystallite size of the (100) plane in a crystal structure model of the space group P-3m1 in the X-ray diffraction pattern of the hydroxide.

In Table 3, "Crystallite size of (110) plane" indicates the crystallite size of the (110) plane of the lithium-containing composite oxide.

In Table 3, "$I_{003}/I_{104}$" indicates the peak intensity ratio between, of the lithium-containing composite oxide, the integral value of the diffraction peak of the (003) plane ($I_{003}$) and the integral value of the diffraction peak of the (104) plane ($I_{104}$).

TABLE 1

| | Hydroxide | | | | | | | | |
|---|---|---|---|---|---|---|---|---|---|
| | [Ni] (%) | [Co] (%) | [Mn] (%) | [$SO_4$] (%) | Crystallite diameter of (100) plane (nm) | SSA [$m^2$/g] | D50 [um] | Production method | Growth time (hour) |
| Example 1 | 50.3 | 19.7 | 30.0 | 0.58 | 28.7 | 12.1 | 5.7 | Seeding | 71 |
| Example 2 | 50.3 | 19.7 | 30.0 | 0.58 | 28.7 | 12.1 | 5.7 | Seeding | 71 |
| Example 3 | 50.3 | 19.7 | 30.0 | 0.58 | 28.7 | 12.1 | 5.7 | Seeding | 71 |
| Example 4 | 50.1 | 19.9 | 30.0 | 0.45 | 29.7 | 12.8 | 5.3 | Seeding | 105 |
| Example 5 | 50.1 | 19.9 | 30.0 | 0.45 | 29.7 | 12.8 | 5.3 | Seeding | 105 |
| Example 6 | 50.3 | 19.7 | 30.0 | 0.58 | 28.7 | 12.1 | 5.7 | Seeding | 71 |
| Example 7 | 50.4 | 20.0 | 29.6 | 0.40 | 22.1 | 15.1 | 5.9 | Batch | 80 |
| Example 8 | 50.4 | 20.0 | 29.6 | 0.39 | 27.5 | 13.9 | 5.4 | Batch | 106.5 |
| Example 9 | 45.2 | 29.8 | 25.0 | 0.33 | 27.2 | 9.8 | 6.1 | Seeding | 24.5 |
| Example 10 | 45.2 | 29.8 | 25.0 | 0.33 | 27.2 | 9.8 | 6.1 | Seeding | 24.5 |
| Example 11 | 45.2 | 29.8 | 25.0 | 0.33 | 27.2 | 9.8 | 6.1 | Seeding | 24.5 |
| Example 12 | 34.9 | 35.0 | 30.1 | 0.38 | 22.6 | 15.0 | 5.1 | Seeding | 24.5 |
| Example 13 | 34.9 | 35.0 | 30.1 | 0.38 | 22.6 | 15.0 | 5.1 | Seeding | 24.5 |
| Example 14 | 34.9 | 35.0 | 30.1 | 0.38 | 22.6 | 15.0 | 5.1 | Seeding | 24.5 |
| Example 15 | 50.1 | 20.0 | 29.9 | 0.58 | 23.8 | 28.5 | 4.7 | Seeding | 28 |
| Example 16 | 50.3 | 19.7 | 30.0 | 0.58 | 28.7 | 12.1 | 5.7 | Seeding | 71 |
| Example 17 | 49.8 | 20.0 | 30.2 | 0.42 | 37.6 | 4.7 | 11.8 | Seeding | 200 |
| Example 18 | 50.1 | 20.0 | 29.9 | 0.27 | 45.2 | 9.0 | 13.9 | Seeding | 143 |
| Example 19 | 50.1 | 20.0 | 29.9 | 0.27 | 45.2 | 9.0 | 13.9 | Seeding | 143 |

TABLE 2

| | Mixing | | | Heating | |
|---|---|---|---|---|---|
| | Lithium/transition metal ratio ($M_L/M_T$) | [Zr] (%) | [W] (%) | Calcination temperature (° C.) | Heating time (hour) |
| Example 1 | 1.08 | 0.3 | 0 | 910 | 8 |
| Example 2 | 1.04 | 0.3 | 0 | 910 | 8 |
| Example 3 | 1.04 | 0 | 0 | 910 | 8 |
| Example 4 | 1.08 | 0 | 0.3 | 910 | 8 |
| Example 5 | 1.08 | 0 | 0 | 910 | 8 |
| Example 6 | 1.04 | 0 | 0 | 930 | 8 |
| Example 7 | 1.04 | 0 | 0 | 910 | 8 |
| Example 8 | 1.04 | 0 | 0 | 910 | 8 |
| Example 9 | 1.08 | 0.3 | 0 | 910 | 8 |
| Example 10 | 1.04 | 0.3 | 0 | 910 | 8 |
| Example 11 | 1.04 | 0 | 0 | 910 | 8 |
| Example 12 | 1.08 | 0.3 | 0 | 910 | 8 |
| Example 13 | 1.04 | 0.3 | 0 | 910 | 8 |
| Example 14 | 1.04 | 0 | 0 | 910 | 8 |
| Example 15 | 1.04 | 0 | 0 | 950 | 8 |
| Example 16 | 1.04 | 0 | 0 | 950 | 8 |
| Example 17 | 1.04 | 0 | 0 | 910 | 8 |
| Example 18 | 1.04 | 0 | 0 | 910 | 8 |
| Example 19 | 1.04 | 0 | 0 | 950 | 8 |

TABLE 3

| | Lithium-containing composite oxide | | | | | | | | | Battery characteristics | |
|---|---|---|---|---|---|---|---|---|---|---|---|
| | α | x | y | z | a1 or a2 | Crystallite diameter of (110) plane (nm) | $I_{003}/I_{104}$ | SSA [m²/g] | D50 [μm] | Cycle characteristics (%) | Rate characteristics (%) |
| Example 1 | 1.101 | 0.501 | 0.200 | 0.296 | 0.003 | 62.7 | 1.20 | 0.89 | 7.1 | 97.5 | 85.3 |
| Example 2 | 1.078 | 0.496 | 0.202 | 0.299 | 0.003 | 62.5 | 1.18 | 1.27 | 5.1 | 95.2 | 84.0 |
| Example 3 | 1.065 | 0.503 | 0.201 | 0.296 | 0.000 | 70.3 | 1.18 | 0.77 | 7.4 | 94.9 | 83.6 |
| Example 4 | 1.059 | 0.498 | 0.202 | 0.297 | 0.003 | 64.6 | 1.21 | 0.67 | 7.6 | 95.0 | 85.1 |
| Example 5 | no data | no data | no data | no data | no data | 67.6 | 1.21 | 0.70 | 7.8 | 93.2 | 85.7 |
| Example 6 | no data | no data | no data | no data | no data | 71.2 | 1.19 | 0.70 | 8.5 | 93.6 | 84.2 |
| Example 7 | no data | no data | no data | no data | no data | 68.6 | 1.20 | 0.98 | 6.6 | 91.4 | 84.2 |
| Example 8 | no data | no data | no data | no data | no data | 67.1 | 1.20 | 0.85 | 6.6 | 92.6 | 85.8 |
| Example 9 | 1.054 | 0.450 | 0.300 | 0.247 | 0.003 | 65.9 | 1.27 | 0.58 | 8.1 | 95.8 | 87.9 |
| Example 10 | no data | no data | no data | no data | no data | 66.1 | 1.25 | 0.67 | 6.5 | 95.5 | 87.0 |
| Example 11 | 1.053 | 0.453 | 0.299 | 0.248 | 0.000 | 72.0 | 1.28 | 0.68 | 6.4 | 94.1 | 85.1 |
| Example 12 | 1.056 | 0.349 | 0.350 | 0.298 | 0.003 | 62.0 | 1.29 | 1.55 | 5.3 | 96.6 | 86.5 |
| Example 13 | no data | no data | no data | no data | no data | 63.9 | 1.27 | 1.65 | 5.5 | 96.1 | 85.5 |
| Example 14 | 1.066 | 0.351 | 0.351 | 0.298 | 0.000 | 65.2 | 1.27 | 1.76 | 5.3 | 95.5 | 84.8 |
| Example 15 | 1.012 | 0.500 | 0.203 | 0.297 | 0.000 | 73.3 | 1.22 | 0.97 | 8.7 | 86.1 | 82.3 |
| Example 16 | no data | no data | no data | no data | no data | 74.0 | 1.21 | 0.82 | 9.2 | 84.3 | 81.0 |
| Example 17 | 1.024 | 0.500 | 0.203 | 0.297 | 0.000 | 59.5 | 1.10 | 0.24 | 11.9 | 93.3 | 78.6 |
| Example 18 | no data | no data | no data | no data | no data | 66.7 | 1.09 | 0.24 | 13.2 | 93.3 | 71.6 |
| Example 19 | no data | no data | no data | no data | no data | 80.6 | 1.12 | 0.38 | 13.7 | 86.9 | 75.6 |

Example 1

Production Example by the Seeding Method

A nickel sulfate (II) and a hexahydrate, a cobalt sulfate (II) and a heptahydrate, and a manganese sulfate (II) and a hydrate were weighed in such a manner that a molar ratio of an element of Ni, a molar ratio of an element of Co, and a molar ratio of an element of Mn became 0.5:0.2:0.3. Next, they were dissolved in distilled water so that the total concentration of them became 1.5 mol/L and aqueous transition metal salt solution was prepared.

A sodium hydroxide was dissolved in water, and aqueous sodium hydroxide solution with 6 mol/L was prepared. An ammonium sulfate was dissolved in water, and aqueous ammonium salt solution with 0.83 mol/L was prepared.

Seed crystals were produced by the coprecipitation method, and with the use of the seed crystals, a hydroxide was obtained by the seeding method.

Distilled water was put into a first reaction tank with capacity of 30 L to be heated to 50° C. While supplying nitrogen gas into the first reaction tank and stirring an initial solution at stirring power of 1.3 kw/m³, the above-described aqueous transition metal salt solution was added at an addition rate of 2.1 L/hr, and the above-described aqueous ammonium salt solution was added at an addition rate of 0.4 L/hr.

During the addition of the aqueous transition metal salt solution, the above-described aqueous sodium hydroxide solution was added so that the pH of the solution in the first reaction tank could be maintained to 11.6. Thereby, seed crystals containing respective elements of Ni, Co, and Mn were made to precipitate.

Next, the solution containing the seed crystals was supplied into a second reaction tank (V21) with a capacity of 450 L from the first reaction tank, and at the point when the second reaction tank was filled with the solution, crystal growth was started.

While causing the solution containing the seed crystals in the second reaction tank to bubble by a nitrogen gas and maintaining the temperature of the solution to 50° C., the solution was stirred at a stirring power of 1.3 kw/m³. To the solution containing the seed crystals, the above-described aqueous transition metal salt solution was added at an addition rate of 31.5 L/hr and the aqueous ammonium salt solution was added at an addition rate of 6 L/hr.

During the addition of the aqueous transition metal salt solution, the above-described aqueous sodium hydroxide solution was added so that the pH of the solution in the second reaction tank could be maintained to 11.3, and the seed crystals were made to grow by the coprecipitation method. Further, during the growth, only a supernatant liquid was taken from an overflow outlet port of the second reaction tank through a filter cloth, and coprecipitates were left inside the second reaction tank. The growth time of the crystals was set to 71 hours, and a slurry of the coprecipitates being suspended in a reaction solution was obtained. The obtained slurry was dried at 120° C. for 15 hours and then a transition metal hydroxide illustrated in Table 1 was obtained.

The obtained hydroxide, a lithium carbonate, and a zirconium oxide were mixed at the molar ratio illustrated in Table 2 to be heated, and a lithium-containing composite oxide was obtained. The composition and physical properties of the obtained lithium-containing composite oxide are illustrated in Table 3.

Examples 2 to 6

A lithium-containing composite oxide powder was obtained by the same method as that of Example 1. However, the growth time of crystals was set to the time illustrated in Table 1. A hydroxide, a lithium carbonate, and a zirconium oxide or a tungsten oxide were mixed under the condition described in Table 2 to be heated, and a lithium-containing composite oxide was obtained. However, in Table 2, the mixing ratio of a zirconium oxide or a tungsten oxide being 0 mol % means that they were not mixed. The same is also applied below.

Example 7

Production Example by the Batch Method

An initial solution, an aqueous transition metal salt solution, an aqueous sodium hydroxide solution, and an aqueous ammonium salt solution were prepared in the same manner as that in Example 1.

A hydroxide was obtained by the batch method (see FIG. 1). Distilled water was put into a reaction tank with a capacity of 17 L and was heated to 50° C. While stirring the initial solution in the reaction tank at a stirring power of 1.6 kw/m³, the aqueous transition metal salt solution was added at an addition rate of 1.2 L/hr and the aqueous ammonium salt solution was added at an addition rate of 0.23 L/hr for 80 hours.

During the addition of the aqueous transition metal salt solution, the aqueous sodium hydroxide solution was added so that the pH of the solution in the reaction tank could be maintained to 11.3, and coprecipitates containing respective elements of Ni, Co, and Mn were made to precipitate. During the precipitation, a nitrogen gas was supplied into the reaction tank.

During the precipitation, only a supernatant liquid was taken from an overflow outlet port of the reaction tank through a filter cloth, and the coprecipitates were left inside the reaction tank. The growth time was set to 80 hours, and a slurry of the coprecipitates being suspended in a reaction solution was obtained.

Next, from the slurry, a transition metal hydroxide illustrated in Table 1 was separated by the same method as that in Example 1. The obtained hydroxide and a lithium carbonate were mixed under the condition described in Table 2 to be heated, and a lithium-containing composite oxide was obtained. The composition and physical properties of the obtained lithium-containing composite oxide are illustrated in Table 3.

Example 8

A lithium-containing composite oxide powder was obtained by the same method as that of Example 7. However, the growth time of crystals was set to the time illustrated in Table 1. A hydroxide, a lithium carbonate, and a zirconium oxide or a tungsten oxide were mixed under the condition described in Table 2 to be heated, and a lithium-containing composite oxide was obtained. The composition and physical properties of the obtained lithium-containing composite oxide are illustrated in Table 3.

Example 9

Production Example by the Seeding Method

A nickel sulfate (II) and a hexahydrate, a cobalt sulfate (II) and a heptahydrate, and a manganese sulfate (II) and a hydrate were weighed in such a manner that a molar ratio of an element of Ni, a molar ratio of an element of Co, and a molar ratio of an element of Mn became 0.45:0.30:0.25. Next, they were dissolved in distilled water so that the total concentration of them became 1.5 mol/L and aqueous transition metal salt solution was obtained. Aqueous sodium hydroxide solution and aqueous ammonium salt solution were prepared in the same manner as that of Example 1.

By the seeding method, a slurry containing a hydroxide was prepared (see FIG. 2). Distilled water was put into a first reaction tank with a capacity of 10 L to be heated to 50° C. While supplying a nitrogen gas into the first reaction tank and stirring an initial solution at a stirring power of 1.3 kw/m³, the above-described aqueous transition metal salt solution was added at an addition rate of 0.7 L/hr, and the above-described aqueous ammonium salt solution was added at an addition rate of 0.3 L/hr.

During the addition of the aqueous transition metal salt solution, the aqueous sodium hydroxide solution was added so that the pH of the solution in the first reaction tank could be maintained to 11.0, and seed crystals containing respective elements of Ni, Co, and Mn were made to precipitate. During the precipitation reaction, a nitrogen gas was supplied into the first reaction tank.

The solution containing the seed crystals was made to overflow from the first reaction tank to be supplied into a second reaction tank with a capacity of 10 L. Thereafter, at the point when the second reaction tank was filled with the solution, crystal growth was started.

While causing the solution containing nuclei in the second reaction tank to bubble by a nitrogen gas and maintaining the temperature of the solution to 50° C., the solution was stirred at a stirring power of 1.3 kw/m³. To the solution containing the seed crystals, the aqueous transition metal salt solution was added at an addition rate of 0.7 L/hr and the aqueous ammonium salt solution was added at an addition rate of 0.3 L/hr.

During the addition of the aqueous transition metal salt solution, the aqueous sodium hydroxide solution was added so that the pH of the solution in the second reaction tank could be maintained to 11.0, and the seed crystals were made to grow by the coprecipitation method. During the growth of the crystals, a nitrogen gas was supplied into the second reaction tank. Further, during the growth, only a supernatant liquid was taken from an overflow outlet port of the second reaction tank through a filter cloth, and coprecipitates were left inside the second reaction tank. The growth time of the coprecipitates was 24.5 hours, and a slurry of the coprecipitates being suspended in the aqueous solution was obtained.

From the obtained slurry, a transition metal hydroxide illustrated in Table 1 was separated by the same method as that of Example 1.

The obtained hydroxide, a lithium carbonate, and a zirconium oxide were mixed under the condition described in Table 2 to be heated, and a lithium-containing composite oxide was obtained. The composition and physical properties of the obtained lithium-containing composite oxide are illustrated in Table 3.

Examples 10 and 11

A lithium-containing composite oxide powder was obtained by the same method as that of Example 9. However, the growth time of crystals was set to the time illustrated in Table 1. A hydroxide, a lithium carbonate, and a zirconium oxide or a tungsten oxide were mixed under the condition described in Table 2 to be heated, and a lithium-containing composite oxide was obtained. The composition and physical properties of the obtained lithium-containing composite oxide are illustrated in Table 3.

Example 12

Production Example by the Seeding Method

A nickel sulfate (II) and a hexahydrate, a cobalt sulfate (II) and a heptahydrate, and a manganese sulfate (II) and a hydrate were weighed in such a manner that a molar ratio of an element of Ni, a molar ratio of an element of Co, and a molar ratio of an element of Mn became 0.35:0.35:0.30. Next, they were dissolved in distilled water so that the total concentration of them became 1.5 mol/L and an aqueous transition metal salt solution was prepared. An aqueous sodium hydroxide solution and an aqueous ammonium salt solution were prepared in the same manner as that of Example 1.

By the seeding method, a slurry containing a hydroxide was prepared. Distilled water was put into a first reaction tank with a capacity of 17 L to be heated to 50° C. While supplying a nitrogen gas into the first reaction tank and stirring an initial solution at a stirring power of 1.3 kw/m$^3$, the above-described aqueous transition metal salt solution was added at an addition rate of 1.2 L/hr, and the above-described aqueous ammonium salt solution was added at an addition rate of 0.5 L/hr.

During the addition of the aqueous transition metal salt solution, the aqueous sodium hydroxide solution was added so that the pH of the solution in the first reaction tank could be maintained to 11.0, and seed crystals containing respective elements of Ni, Co, and Mn were made to precipitate. During the precipitation, a nitrogen gas was supplied into the first reaction tank.

The solution containing the seed crystals was supplied into a second reaction tank (V21) with a capacity of 17 L from the first reaction tank and at the point when the second reaction tank was filled with the solution, crystal growth was started.

While causing the solution containing the seed crystals in the second reaction tank to bubble by a nitrogen gas and maintaining the temperature of the solution to 50° C., the solution was stirred at a stirring power of 1.3 kw/m$^3$. Further, to the solution containing the seed crystals, the aqueous transition metal salt solution was added at an addition rate of 1.2 L/hr and the aqueous ammonium salt solution was added at an addition rate of 0.5 L/hr.

During the addition of the aqueous transition metal salt solution, the aqueous sodium hydroxide solution was added so that the pH of the solution in the second reaction tank could be maintained to 11.2, and the seed crystals were made to grow by the coprecipitation method. During the growth of the crystals, a nitrogen gas was supplied into the second reaction tank. Further, during the growth, only a supernatant liquid was taken from an overflow outlet port of the second reaction tank through a filter cloth, and coprecipitates were left inside the second reaction tank. The growth time of the coprecipitates was 24.5 hours, and a slurry of the coprecipitates being suspended in the aqueous solution was obtained. From the obtained slurry, a hydroxide was separated by the same method as that of Example 1, and a lithium-containing composite oxide was obtained by the same method as that of Example 1. The composition and physical properties of the obtained lithium-containing composite oxide are illustrated in Table 3.

Examples 13 and 14

A lithium-containing composite oxide powder was obtained by the same method as that of Example 12. However, the growth time of crystals was set to the time illustrated in Table 1. A hydroxide, a lithium carbonate, and a zirconium oxide or a tungsten oxide were mixed under the condition described in Table 2 to be heated, and a lithium-containing composite oxide was obtained. The composition and physical properties of the obtained lithium-containing composite oxide are illustrated in Table 3.

Example 15

Reference Example

A hydroxide was obtained by the same method as that of Example 1. However, the stirring power in the second reaction tank was set to 0.6 kw/m$^3$, the addition rate of the aqueous ammonium salt solution was set to 18 L/hr, and the growth time of the crystals was set to 28 hours.

The hydroxide and a lithium carbonate were mixed under the condition described in Table 2 to be heated, and a lithium-containing composite oxide was obtained. The composition and physical properties of the obtained lithium-containing composite oxide are illustrated in Table 3.

Example 16

Reference Example

A hydroxide was obtained by the same method as that of Example 1. Next, the hydroxide and a lithium carbonate were mixed under the condition described in Table 2 to be heated, and a lithium-containing composite oxide was obtained. The composition and physical properties of the obtained lithium-containing composite oxide are illustrated in Table 3.

Example 17

Reference Example

A hydroxide was obtained by the same method as that of Example 1. However, as the first reaction tank, one with a capacity of 17 L was used, and as the second reaction tank, one with a capacity of 12 L was used. The stirring power of the distilled water in the first reaction tank was set to 1.6 kw/m$^3$, the addition rate of the aqueous transition metal salt solution was set to 1.2 L/hr, and the addition rate of the aqueous ammonium salt solution was set to 0.1 L/hr. During the addition of the aqueous transition metal salt solution, the aqueous sodium hydroxide solution was added so that the pH of the solution in the first reaction tank could be maintained to 10.7.

In the second reaction tank, the stirring power was set to 1.3 kw/m$^3$, the aqueous transition metal salt solution was added at an addition rate of 0.8 L/hr, and the aqueous ammonium salt solution was added at an addition rate of 0.08 L/hr. During the addition of the aqueous transition metal salt solution, the aqueous sodium hydroxide solution was added so that the pH of the solution in the second reaction tank could be maintained to 10.7. The growth time of the crystals was set to 200 hours.

The obtained hydroxide and a lithium carbonate were mixed under the condition described in Table 2 to be heated, and a lithium-containing composite oxide was obtained. The composition and physical properties of the obtained lithium-containing composite oxide are illustrated in Table 3.

Example 18

Reference Example

A hydroxide was obtained by the same method as that of Example 1. However, as the first reaction tank, one with a capacity of 17 L was used, and as the second reaction tank, one with a capacity of 10 L was used. The stirring power of the distilled water in the first reaction tank was set to 1.6 kw/m$^3$, the addition rate of the aqueous transition metal salt solution was set to 0.8 L/hr, and the addition rate of the aqueous ammonium salt solution was set to 0.07 L/hr. During the addition of the aqueous transition metal salt solution, the aqueous sodium hydroxide solution was added so that the pH of the solution in the first reaction tank could be maintained to 10.0.

In the second reaction tank, the stirring power was set to 1.6 kw/m$^3$, the aqueous transition metal salt solution was added at an addition rate of 0.8 L/hr, and the aqueous ammonium salt solution was added at an addition rate of 0.07 L/hr. During the addition of the aqueous transition metal salt solution, the aqueous sodium hydroxide solution was added so that the pH of the solution in the second reaction tank could be maintained to 10.0. The growth time of the crystals was set to 143 hours.

The obtained hydroxide and a lithium carbonate were mixed under the condition described in Table 2 to be heated, and a lithium-containing composite oxide was obtained. The composition and physical properties of the obtained lithium-containing composite oxide are illustrated in Table 3.

Example 19

Reference Example

A hydroxide was obtained in the same manner as that of Example 1. Next, the hydroxide and a lithium carbonate were mixed under the condition described in Table 2 to be heated, and a lithium-containing composite oxide was obtained. The composition and physical properties of the obtained lithium-containing composite oxide are illustrated in Table 3.

[Manufacturing Example of a Positive Electrode]

Each of the lithium-containing composite oxides obtained in Example 1 to Example 19, acetylene black (conductive material), and an N-methylpyrrolidone solution containing 12.0 mass % of polyvinylidene fluoride (binder) were mixed. For the mixing, a planetary centrifugal mixer (apparatus name: Awatorirentaro ARE-310 manufactured by THINKY CORPORATION) was used. Further, N-methylpyrrolidone was added to the mixture and a slurry was prepared. At this time, the mass ratio of the cathode active material, the acetylene black, and the polyvinylidene fluoride was set to 90:5:5.

The obtained slurry was applied to one side of an aluminum foil having a thickness of 20 μm (positive electrode current collector) and a positive electrode sheet was fabricated. Then, the positive electrode sheet was rolled two times by a roll press with a gap of 40 μm. Thereafter, the positive electrode sheet was punched out into a circular shape having a diameter of 18 mm and then was vacuum dried at 180° C., and thereby a positive electrode was manufactured.

[Manufacture of a Lithium Ion Secondary Battery]

In an Ar glove box, the positive electrode manufactured as above, a separator (product name: #2500 manufactured by Celgard), and a negative electrode were staked in order on a simplified sealed cell type battery evaluation cell (made of stainless steel). As the negative electrode, one obtained by forming a metal lithium foil (having an average thickness of 300 μm) on a negative electrode current collector (stainless steel sheet having an average thickness of 1 mm) was set. Further, the average thickness of the separator was set to 50 μm.

[Evaluation of the Lithium Ion Secondary Battery]

The cycle characteristics and the rate characteristics of the above-described lithium ion secondary battery having each of the lithium-containing composite oxides were evaluated. Their evaluation results are illustrated in Table 3.

In Table 3, "Cycle characteristics" indicates a ratio of the discharge capacity at the 50th charge to the discharge capacity at the first charge. Regarding this cycle capacity retention rate (%), in a constant current mode, it was charged up to 4.3 V at a load current of 192 mA per 1 g of the lithium-containing composite oxide. Next, in a constant voltage mode, it was brought to 4.3 V and was retained. The constant current mode and the constant voltage mode were performed for three hours in total. Next, in the constant current mode, it was discharged down to 2.75 V at a load current of 160 mA per 1 g of the cathode active material. This charge and discharge was performed 50 times repeatedly.

In Table 3, "Rate characteristics" indicate a ratio of the capacity at a charge and discharge rate of 5 C to the capacity at a charge and discharge rate of 0.2 C. The discharge capacity when it was charged under the same condition as in the measurement of the cycle retention rate and it was discharged down to 2.75 V at a load current of 32 mA (0.2 C) per 1 g of the lithium-containing composite oxide, and the discharge capacity when it was charged under the same condition as in the measurement of the cycle retention rate and it was discharged down to 2.75 V at a load current of 800 mA (5 C) per 1 g of the lithium-containing composite oxide were each measured.

From Table 1 and Table 3, it is found that in the lithium-containing composite oxide produced with the use of the hydroxide having a crystallite size of the (100) plane in the space group of P-3m1 being 35 nm or less under the condition of the heating temperature being 930° C. or lower, $I_{(003)}/I_{(104)}$ is large. Thereby, it is thought that in the lithium-containing composite oxide, the occurrence of cation mixing is suppressed. Therefore, the lithium ion secondary battery having the lithium-containing composite oxide is excellent in rate characteristics.

As is understood from Table 2 and Table 3, as long as the heating temperature is 930° C. or lower, the crystallite size of the (110) plane of a lithium-containing composite oxide can be made small. Therefore, the lithium ion secondary battery having the lithium-containing composite oxide is excellent in cycle characteristics.

As is understood from Example 4 and Example 5 of Table 1, when the mixture obtained by mixing the zirconium compound or the tungsten compound with the hydroxide and the lithium compound is heated, the crystallite size of the (110) plane of a lithium-containing composite oxide can be made small. As a result, the lithium ion secondary battery having the lithium-containing composite oxide obtained by heating the mixture is excellent in cycle characteristics.

What is claimed is:
1. A lithium-containing composite oxide represented by Formula 5-B,
wherein a peak intensity ratio ($I_{003}/I_{104}$) of an integral value ($I_{003}$) of a diffraction peak of the (003) plane and an integral value ($I_{104}$) of a diffraction peak of the (104) plane in an X-ray diffraction pattern is from 1.18 to 1.35, and a crystallite size of the (110) plane in the X-ray diffraction pattern is less than 30 nm; and wherein Formula 5-B is:

$Li_{\alpha 2}Ni_{x2}Mn_{y2}Co_{z2}Me_{a2}O_{b2}$ ..., wherein Me represents at least one type of element selected from the group consisting of Mg, Ca, Al, Ti, V, Cr, Nb, Mo, W, and Zr, and wherein $\alpha 2$, x2, y2, z2, a2, and b2 satisfy the relations of $1.02 \leq \alpha 2 \leq 1.2$, $0.3 < x2 \leq 0.6$, $0.2 \leq y2 \leq 0.4$, $0.15 \leq z2 \leq 0.35$, $0 \leq a2 \leq 0.1$, x2+y2+z2+a2=1, and $1.9 \leq b2 \leq 2.1$ respectively.

2. The lithium-containing composite oxide according to claim 1, wherein a specific surface area of the lithium-containing composite oxide is 0.1 to 10 $m^2/g$.

3. The lithium-containing composite oxide according to claim 1, wherein the peak intensity ratio ($I_{003}/I_{104}$) is 1.20 to 1.35.

4. The lithium-containing composite oxide according to claim 1, wherein x2 satisfies the relation of $0.33 \leq x2 \leq 0.6$.

* * * * *